Figure 1:
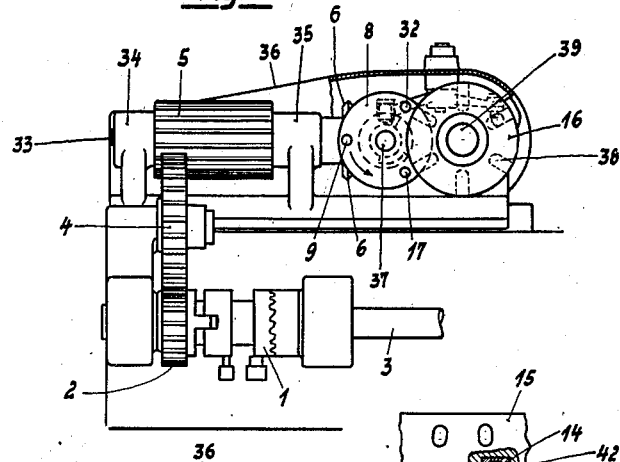

Jan. 22, 1935. K. TESSKY 1,988,675
APPARATUS FOR INDEXING TURRET HEADS
Filed Sept. 16, 1931 2 Sheets-Sheet 1

Inventor:
Karl Tessky

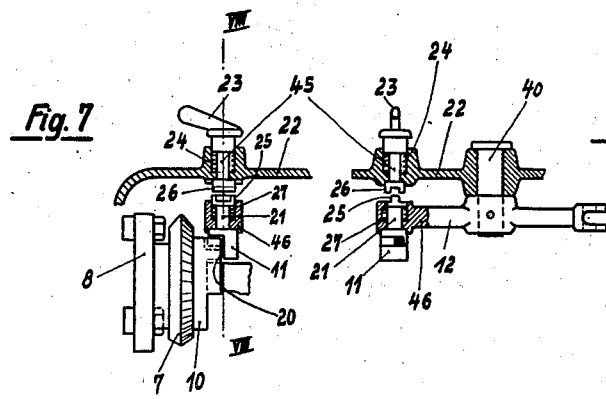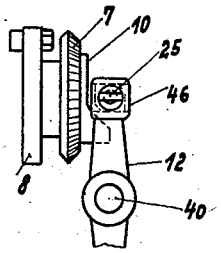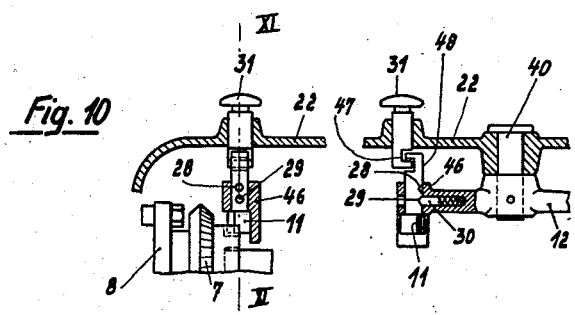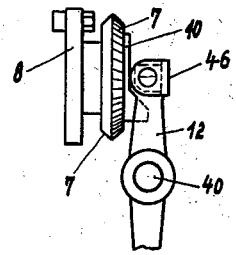

Patented Jan. 22, 1935

1,988,675

UNITED STATES PATENT OFFICE 1,988,675

APPARATUS FOR INDEXING TURRET HEADS

Karl Tessky, Esslingen-on-the-Neckar, Germany

Application September 16, 1931, Serial No. 563,102
In Germany September 22, 1930

5 Claims. (Cl. 29—50)

My invention relates to apparatus for indexing turret heads, and more particularly turret heads in which the indexing is varied. To this end, in combination with the normal means for indexing and locking the turret head I provide a plurality of cams for operating the locking means, and means for selectively connecting the locking means to one of the cams.

The indexing and locking of turret heads, for instance by a Geneva-stop mechanism, and particularly in automatic lathes, is normally effected by a disc supporting a pin equipped with a roller which engages in slots of a disc on the shaft of the turret head as the disc supporting the roller pin is rotated and thereby indexes the turret head. After the head has been indexed it is locked by a locking bolt which before the beginning of the partial or indexing rotation of the turret head was disengaged from the turret head by means of a cam on the roller-pin disc and an intermediate lever, or other suitable means, and the head is permitted to return to its locking position after the indexing operation has been performed.

It sometimes occurs that in a machine the turret head of which is adapted to be indexed for a given number of tooling stations, say six, operations must be performed which require fewer tooling stations, for instance, three. In such cases it would involve loss of time to index the turret head not only for the three stations required, but also for the three other stations which are not required. An expedient would be to provide on the roller-pin disc a second roller pin so that the slotted disc and the turret head would be indexed for two stations per revolution of the roller-pin disc. There is no difficulty about providing this extra roller pin as the roller-pin disc is readily accessible from the outside. However, there is a difficulty about the control of the locking bolt for the turret head, as it would be necessary to exchange the cam corresponding to six stations for a cam corresponding to three stations, as the locking bolt must not engage in each recess of the turret head which is presented to it, but only in each second recess. This would necessitate removing the cam corresponding to six stations with the roller-pin disc, and to replace the several parts after the cam corresponding to three stations had been inserted.

According to my invention the change-over from one system of indexing to another, for instance, from three stations to six stations, and vice versa, is much facilitated by providing a multiple cam or a cam provided with a plurality of camming members in combination with means for selectively connecting the means for locking the turret head to one of the cam elements. It has already been proposed in automatic machines to provide several cams and means for selectively operating a member from one of the cams, but not for the purpose specified.

In the following example a multiple cam comprising two cam elements, one for three, and the other for six, indexing stations, will be described in combination with a transmitting member or pin at one end of the lever operating the locking bolt which member is adapted to be alternately placed into active position with respect to the two cam elements. The lever and the locking pin to which it is connected are in this manner alternately operated by one of the cam elements so that the locking pin either engages each recess of the turret head, or each second recess only.

It is understood that I am not limited to two cam elements and to three and six indexing stations but may provide any number of cams or cam elements for any corresponding number of indexing stations.

In the drawings affixed to this specification and forming part thereof apparatus embodying my invention are illustrated diagrammatically by way of example.

Figure 2:
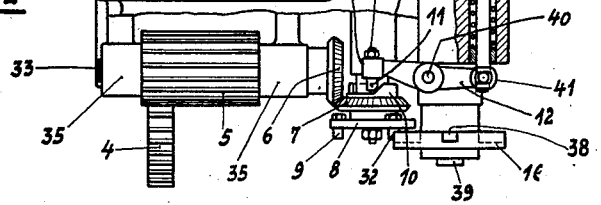
Figure 3:
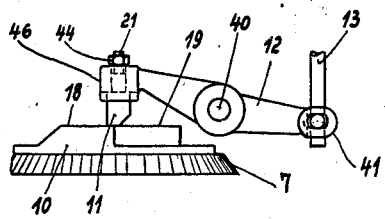
Figure 4:
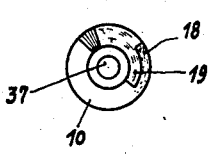
Figure 5:
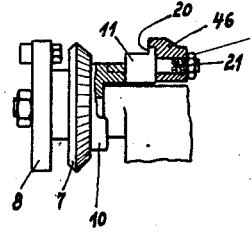
Figure 6:
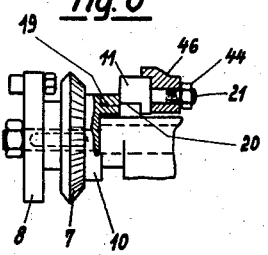

In the drawings,

Fig. 1 is an end elevation showing the Geneva-stop mechanism and its accessories, Fig. 2 is a plan view of the machine partly in section through the axis of the locking bolt, Fig. 3 shows the multiple cam with two cam elements and the cam lever, drawn to a larger scale, with the cam elements developed, Fig. 4 is an end elevation of the cam elements, Figs. 5 and 6 are partly sectional elevations viewed from the right in Fig. 2 and illustrating the transmitting member or pin cooperating with the cam elements in two positions, Fig. 7 is a partly sectional elevation showing a modified member or pin and modified means for adjusting it with respect to the cam elements, Fig. 8 is a section on the line VIII—VIII in Fig. 7, Fig. 9 is a plan view of Fig. 7, Fig. 10 is a partly sectional elevation of another modification of the member or pin and its adjusting means, Fig. 11 is a section on the line XI—XI in Fig. 10, and Fig. 12 is a plan view of Fig. 10.

Referring now to the drawings, and first to Figs. 1 to 6, 3 is a continuously rotating driving shaft, 1 is a clutch adapted to cooperate with the driving shaft and provided with means which are old in the art and therefore not shown, for throwing in the clutch at a given time and for throwing it out after a complete revolution of the shaft 3, 2 is a spur gear adapted to be driven from the shaft 3 through the clutching means, 5 is an elongated pinion on a shaft 33 which is mounted in bearings 34 and 35 on the turret slide 36, and 4 is an intermediate gear connecting the pin 5 to the spur gear 2. 6 is a bevel pinion on the end of the shaft 33 which projects beyond the bearing 35. 7 is a bevel pinion in mesh with the pinion 6 which is mounted to rotate on a shaft 37 extending at right angles to the shaft 33, and 8 is the roller-pin disc of the Geneva-stop mechanism which is secured to, or cast integral with, the pinion 7. 9 and 17 are roller pins on the disc 8, 32 is one of the three holes in the disc 8, 16 is the slotted disc of the Geneva-stop mechanism which in the present instance has six slots 38 and is mounted on a shaft 39, and 15 is the turret head which is mounted on the opposite end of the shaft 39, as shown in Fig. 2.

10 is a cam plate which is attached to or cast integral with the bevel pinion 7 at the side which is opposite the roller-pin disc 8, 12 is the cam lever which is fulcrumed on the turret slide at 40, 11 is a cam follower or a pin in a boss 46 of the lever 12 for cooperation with the cam elements on the cam plate 10 at one end of the lever 12, and 41 is an eye at its opposite end which is connected to the shank 13 of the turret-locking bolt 14. The locking bolt is adapted to engage in recesses of the turret head 15 one of which, with its bushing 42, is shown in Fig. 2. 43 is a spring for moving the bolt 14 toward the turret.

Normally only the pin 9 is inserted in the disc 8, and the slotted disc 16 is rotated through a given angle per revolution of the disc 8 by the pin 9 engaging one of its slots 38. By means of the cam plate 10 the locking bolt 14 is retracted before the pin 9 enters one of the slots 38 in the disc 16 and permitted to engage the bushing 42 corresponding to the following station after the indexing operation has been completed. If it is desired to operate the slotted disc 16 twice per revolution of the disc 8, the pin 17 in inserted as shown in Fig. 1 and each of the pins 9 and 17 now rotates the disc 16 through a given angle per revolution of disc 8. In this case, however, the locking bolt 14 must arrest the turret only at the end of each second indexing operation. In the old machines this was effected by exchangeable cams, as described in the introduction. According to my invention, I provide a plurality of cam elements on the cam plate 10.

Figs. 3 and 4 show two cam elements 18 and 19. The cam elements are arranged coaxially with respect to the axis of the shaft 37 and the elevated portion of the outer element 18 is shorter than the elevated portion of the inner element 19. The outer cam element 18 corresponds to the operation of the disc 8 with the pin 9 only and therefore its elevated portion is so short that the locking bolt 14 engages in the turret after each partial rotation of the disc 16 while the elevated portion of the inner cam element 19 which corresponds to the operation with two pins 9 and 17, is so long that the locking bolt engages only after each second partial rotation of disc 16. The pin 11 is equipped with a threaded extension 21 which is inserted in a hole in the boss 46, and held by a nut 44.

It will appear from Figs. 5 and 6 that the pin 11 is recessed in one of its sides at 20. By turning the pin through an angle of 180° it is either placed in position for bearing on both the inner and the outer cam elements 18 and 19 as shown in Fig. 5, or for bearing on the outer cam element 18 only, as shown in Fig. 6.

Referring now to Figs. 7-9, the pin 11 instead of being arranged with its axis at right angles to the axis of the pivot 40 of the lever 12, as shown in Figs. 1-6, is arranged with its axis in parallel to the axis of the pivot 40. The extension 21 of the pin 11 is unthreaded in the present instance and mounted to rotate in a hole of the boss 46. 27 is a spring surrounding the extension 21, with its lower end bearing on a shoulder in the hole, and its upper end on a key plate 25 at the upper end of the extension 21, for normally holding the pin 11 on a seat in the boss which holds it against rotation. The pin 11 is recessed at 20 as and for the purpose described with reference to Figs. 5 and 6 and means for rotating it are provided in a casing 22 at the turret slide 36 by which the Geneva-stop mechanism is protected from chips. Such means include a claw 26 at the lower end of a shaft 45 which is mounted to rotate in a hole of the casing 22 and provided with a spring 24 abutted on a shoulder in the hole at its lower end and on the boss of a handle 23 on the shaft 45 at its upper end. The spring 24 normally holds the claw 26 disengaged from the key plate 25 at the upper end of the extension 21. In order to reverse the position of the pin 11 with respect to the cam elements on the cam plate 10, the handle 23 is depressed against the action of its spring 24, causing the claw 26 to engage the key plate 25 and moving the pin 11 away from its seat in the boss 46 so that it is free to rotate. The pin is now adjusted with respect to the cam elements 18 and 19 as required and the handle 23 is released whereupon the springs 24 and 27 retract the parts to which they are connected, and the pin 11 is locked against rotation by re-engaging its seat in the boss 46.

Referring now to Figs. 10-12, the pin 11 is mounted to slide in the hole of the boss 46 and equipped with two depressions 28 and 29 and a spring catch 30 for holding the pin in one of two positions for cooperation with one or the other of the two cam elements 18, 19. A handle 31 is mounted to slide in the casing 22 and equipped with a hook 47 at its lower end, the hook engaging a slot in the upper end 48 of the pin 11. By these means the pin is placed in the required position with respect to the cam elements 18, 19 and held in its position by the spring catch 30.

Obviously exactly similar means may be provided for turret heads having more than six stations as illustrated and means according to my invention may be provided for reducing the number of stations to, say, one third of the normal stations instead of one half thereof, and if desired a third roller pin may be inserted in the hole 32 of disc 8.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. An apparatus for indexing the turret heads of lathes and the like, comprising means for indexing a turret head and means for locking the head in a series of indexed positions, a cam provided with a plurality of camming members, a cam follower cooperating with said camming members to render said locking means inoperative during indexing and at certain of said indexed positions, and means for adjusting said cam follower in position to cooperate with at least one of said camming members, thereby varying the number of locking positions per revolution of said turret head.

2. An apparatus for indexing the turret heads of lathes and the like, comprising means for rotating a turret head through a series of predetermined angular positions, means for locking the head in said predetermined positions, a multiple cam, and a cam follower cooperating with said multiple cam for rendering said locking means inoperative during indexing and at certain of said predetermined positions, and adjusting means for positioning said cam follower to cooperate with individual cam elements of said multiple cam, thereby varying the number of predetermined positions at which said locking means is rendered inoperative.

3. The apparatus of claim 2 wherein said cam follower is mounted at one end of a lever, the other end of said lever carrying a member cooperating with said locking means to render the same inoperative.

4. The apparatus of claim 2 wherein said adjusting means comprises a pin holding said cam follower mounted to slide in its mounting and resilient means for locking said pin in various operative positions.

5. The apparatus of claim 2 wherein said adjusting means comprises a pin holding said cam follower mounted to rotate in its mounting and resilient means for locking said pin in its operative positions.

KARL TESSKY.